United States Patent
Zhou et al.

[11] Patent Number: 5,600,772
[45] Date of Patent: Feb. 4, 1997

[54] BIT MAP CONVERTOR USING CHAIN-CODES FOR THE CHARACTER FILLING PROCESS

[75] Inventors: Hao Zhou, Bejing, China; Le Jun Shao, Singapore, Singapore

[73] Assignee: Printronix, Inc., Irvine, Calif.

[21] Appl. No.: 291,445

[22] Filed: Aug. 17, 1994

[51] Int. Cl.$^6$ ........................................... G06T 11/00
[52] U.S. Cl. ........................ 395/170; 382/242; 345/144
[58] Field of Search ........................... 395/150, 151, 395/142; 358/448; 382/242; 345/144

[56] References Cited

U.S. PATENT DOCUMENTS

| | | | |
|---|---|---|---|
| 4,551,092 | 11/1985 | Sayler | 432/32 |
| 4,777,651 | 10/1988 | McCann et al. | 383/242 |
| 4,785,391 | 11/1988 | Apley et al. | 395/150 |
| 4,897,638 | 1/1990 | Kokunishi et al. | 345/142 |
| 4,935,821 | 6/1990 | Sano et al. | 358/427 |
| 4,959,801 | 9/1990 | Apley et al. | 395/150 |
| 4,962,465 | 10/1990 | Saito et al. | 395/150 |
| 4,967,376 | 10/1990 | Katsura | 395/150 |
| 4,974,353 | 12/1990 | Norfolk | 40/447 |
| 5,018,217 | 5/1991 | Yoshida et al. | 382/266 |
| 5,019,486 | 5/1991 | Takakura | 430/307 |
| 5,022,171 | 6/1991 | Norfolk et al. | 40/447 |
| 5,027,304 | 6/1991 | Jeng et al. | 432/32 |
| 5,038,385 | 8/1991 | Kasahara | 382/198 |
| 5,042,075 | 8/1991 | Sato | 382/299 |
| 5,050,228 | 9/1991 | Yoshida et al. | 382/256 |
| 5,068,803 | 11/1991 | Valdes et al. | 395/150 |
| 5,099,230 | 3/1992 | Fujii | 345/144 |
| 5,099,435 | 3/1992 | Collins et al. | 395/150 |
| 5,101,436 | 3/1992 | DeAguiar et al. | 382/241 |
| 5,105,471 | 4/1992 | Yoshida et al. | 382/297 |
| 5,233,671 | 8/1993 | Murayama | 382/242 |
| 5,253,336 | 10/1993 | Yamada | 395/142 |
| 5,355,421 | 10/1994 | Koyama | 382/266 |
| 5,355,449 | 10/1994 | Lung et al. | 382/242 |
| 5,428,728 | 6/1995 | Lung et al. | 395/150 |

*Primary Examiner*—Mark K. Zimmerman
*Assistant Examiner*—Stephen Hong
*Attorney, Agent, or Firm*—George F. Bethel; Patience K. Bethel

[57] ABSTRACT

A data converting apparatus and process for converting outline representations of a character into its bit mapped form using two buffers one being for the bit mapped form of the character symbol and the other for the chain-code representation of the outline of the character are disclosed. Three steps are utilized in the process. The first step draws the character outline on to the drawing buffer and generates the chain-code representation with flags to indicate contour collisions. The contours are then scanned one more time to add missing flags on the chain-code representation. Finally, the inside part of the contour on the drawing buffer is filled using the chain-code representations of the contour, to provide a filled character.

20 Claims, 4 Drawing Sheets

BIT MAP CHARACTER CONVERTOR USING CHAIN-CODES FOR THE CHARACTER FILLING PROCESS

FIELD OF THE INVENTION

This invention relates to the art of generating bit mapped representations of various kinds of characters and other symbols at selectable resolutions and point sizes, from curved representations of their outlines. This invention is more specifically directed toward the filling apparatus and process to convert the outline representation of the characters or symbols to the bit mapped representation.

BACKGROUND OF THE INVENTION AND PRIOR ART

The prior art basically has three method and apparatus to represent fonts in computer displays or desk-top publishing applications. These methods are 1) bit mapped representations; 2) vector representations, and 3) curved representations.

Figure 1:
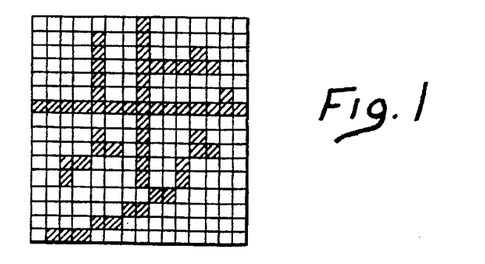
FIG. 1 is a diagrammatic illustration of an image of a 15*16 bit mapped character.

A font is defined in bit mapped representations as a matrix of dots, such as 15×16 dots. See FIG. 1 for an example of such a Chinese character. If one needs to display or print a font of a different size, for instance 24×24, a corresponding dot matrix for that font size is required. When bit mapped fonts are used in Chinese or other Oriental computing and printing systems, a large storage space is needed to keep the dot matrix description of fonts for all styles in different sizes.

The font outline in vector representations is represented by its polygonal approximation. The data points indicating the vertices of the polygon are stored. However, this scheme is not efficient. To approximate a portion of a curve with high accuracy, many small vectors are needed. Moreover, the image output is not very good when these characters are scaled to very large sizes. The net result is that the intersections of the lines are not smooth.

The font outline in curved representations is described by a set of smoothly connected cubic curves. When the character is defined in this way, it is possible to generate different sizes and shapes of characters from the same curved descriptions. All that needs to be done is to specify the scaling factors in an x and y direction.

The process of scaling a character is to carry out a coordinate mapping on the curve representations, and to reconstruct a bit map by using an area filling process. Based on this advantage, the use of outlined fonts have become the trend in desk-top computing and printing systems.

When text is formatted using an outlined font, an efficient and robust process must be provided in order to convert the font described by its outlines into the bit mapped form and fill it in the proper position of the frame buffer for later display or printing.

By robust it is meant that the process should rasterize the fonts of any size with minimum distortion. In outlined fonts, one description is used to generate different sizes of fonts. In such cases problems will appear when the process needs to generate small sized fonts. These problems include broken strokes, over-filling, and distortion. For instance when the fonts are scaled to a small degree, many strokes will become only one pixel wide. If the filling process is not well designed, it may either over-fill or under-fill these strokes. Under-filling will result in broken strokes. Over-filling will result in filling extra blank spaces in the frame buffer. The distortion may be the result of uneven stroke widths for one stroke, merged strokes, and various distortions etc., caused by quantization.

There are many filling processes in the literature. They can be divided into two broad categories; 1). seed fill; and 2). edge fill.

In seed fill processes, a connected contour of the shape to be filled is first drawn on to the drawing buffer. A seed point, known to be in the interior of the shape of the character, is then selected. The process will then fill this pixel and all pixels that can be accessed from the seed pixel. The filling will continue until it reaches the contour points.

The advantage of seed filling is that during the filling process it will not process any pixel outside the contour. However, seed filling presents many problems for conversion of outline characters to bit mapped characters. One drawback of seed filling is the need to supply or find an initial seed point for each contour. The seed point can be supplied as part of the input to the process together with all the contour data. However, when the font size becomes small, one contour may split into two or more separate contours. The seed point as supplied will fall inside one of those contours and only that contour can then be filled resulting in under-filling. If all the seed points need to be found by the process itself before filling takes place, the process will become quite complicated.

Edge filling can also be called scan conversion filling. The first step in edge filling processes is to also draw the font's contour on to a drawing buffer. The next step is to scan the whole drawing buffer line by line and fill the interior of the contour. Within each horizontal scan line, the process will fill segments between the first and second contour pixels, the third and fourth contour pixels, and the subsequent sets of contour pixels. This is based upon the fact that a straight line intersects any closed contour an even number of times. If the first point of the line lies outside the contour, then one can traverse it and decide which segments are in the interior by counting the number of intersections.

All edge filling processes have to cope with special cases such as corner points, and overlapped contours in order for the processes to work correctly all the time. Usually, the processes must scan the whole drawing buffer to fill it correctly. Moreover, the method needs to undertake extra procedures to avoid over-filling and under-filling. Sometimes another buffer of memory is needed to store the contours. This makes the process less efficient.

The objective of this invention is to provide a robust and efficient filling apparatus and process for generating bit mapped characters through their outline descriptions. It needs less memory, processes faster, and avoids over-filling and under-filling.

Compared with other patents, this invention has the following important features and objects of the invention.

The invention converts the curved description of contours into their bit mapped description at first, and then fills the interior of the contour to obtain the bit mapped font.

During the contour conversion process, some chain-code flags are set on the chain-code description to indicate the contour collisions.

During the filling process the chain-code description helps to scan and fill only the interior of the contours to improve speed. The chain-code flags help to avoid the over-filling problem.

The establishment of the filling direction is based on the direction of the contours of the font. This avoids the under-filling problem of the seed fill processes when the font size is small.

Two memory buffers are used in this invention. One is for the image of the font. The size of this buffer is the same as the biggest character with one bit for one pixel. The other is used to store the chain-code and chain-code flags.

A curtailing function is used to avoid the over-filling problem created by the difference between the mathematical or parametric description and the pixel description of the outline.

These differences as to the known prior art are quite apparent when comparing with some of the following relevant patents.

U.S. Pat. No. 4,551,092 is mainly concerned with how to control the stroke width of the characters during character conversion from outline form to bit mapped form, especially when the character size is small. This is called hinting, not filling. The topic of interest in the Patent is different from the object and essence of this invention.

U.S. Pat. No. 4,785,391 and No. 4,959,801 each relate to a like process. One is an improvement to the other. The main teaching in the Patents is a new method to represent the fonts, in order to improve the quality of character generations, especially for small sized characters.

U.S. Pat. No. 5,038,385 deals with contour filling. It firstly scans the contours to establish some marks on the drawing buffer. For example it establishes the first and second type of picture elements. It then obtains direction code sequences as defined by the process. Then, it fills the inside by raster scan, aided by the marks on the drawing buffer and the direction code. The differences between this Patent and the invention hereof are:

1) The Patent generates marks on the drawing buffer to aid filling. On the other hand the invention draws the outline on the drawing buffer and sets some flags on the chain-code description of the contours to aid in filling.

2) The invention generates the chain-code contours to help scan only the inner part of the contour and the contour itself that is to be filled. The Patent to the contrary needs to scan the whole drawing buffer to fill the character.

3) The invention uses one bit in the drawing buffer to represent one pixel of the bit map form. However, the Patent uses at least two bits in the drawing buffer to represent one pixel of the bit map form, in order to have room for the marks.

U.S. Pat. No. 4,967,376 is directed toward contour filling for fonts. It firstly scans the contours to set up some marks on the drawing buffer which can be the left edge mark or the right edge mark. Then it scans the whole drawing buffer to initiate filling. There are several differences as enumerated between this Patent and the invention.

1) This patent generates marks on the drawing buffer to aid filling. However, the invention draws the outline on the drawing buffer and sets some flags on the chain-code description of the contours to aid in filling.

2) The invention generates the chain-code of contours to help to scan only the inner part of the contour and the contour itself to fill. However, the Patent needs to scan the whole drawing buffer in order to provide filling.

3) The invention uses one bit in the drawing buffer to represent one pixel of the bit mapped form. The Patent on the other hand uses two memory planes of the same size. One is the drawing plane and the other is the control plane.

4) Furthermore, the invention has a special curtailing function which the Patent does not have.

SUMMARY OF THE INVENTION

In summation the invention achieves the above objects through the use of chain-code flags. More particularly chain-code flags are used to indicate the collision of contours to help to avoid broken strokes and over-filling problems. Two memory buffers are used. One is a drawing buffer, while the other is for chain-code representation of the contours.

The fields of electronic publishing systems, word processing systems, and others use outline descriptions to store characters and symbols. In order to generate a bit mapped character of a given size, the outline description must be scaled down, be drawn in the image buffer, and then filled. The present invention combines these things together. There are three steps in the current invention.

In the first step, the outline of the character or symbol is drawn in the drawing buffer, the chain-code representation is generated, and flags to indicate contour collisions are set on the chain-code representation.

In the second step the contours are scanned one more time to add missing flags on the chain-code representation.

In the third step the inside part of the contour on the drawing buffer is filled. During filling, the process scans and fills the drawing buffer line by line. However, it never scans outside of the contour. It achieves this without the need to have a seed point to help the filling. Furthermore, in the third step a special technique is employed to adjust rounding error to make the strokes of the characters thinner and nearer to the original ones. This is used to avoid the one pixel over-filling problem that is faced by previous filling processes.

This process and apparatus combines the advantages of edge filling and seed filling and at the same time avoids their disadvantages, making it a very efficient and robust process system and apparatus.

The features and advantages of the present invention will be more readily understood and apparent from the following detailed description of the invention, which should be read in conjunction with the accompanying drawing.

DETAILED DESCRIPTION OF THE PREFERRED EMBODIMENTS

Figure 2:
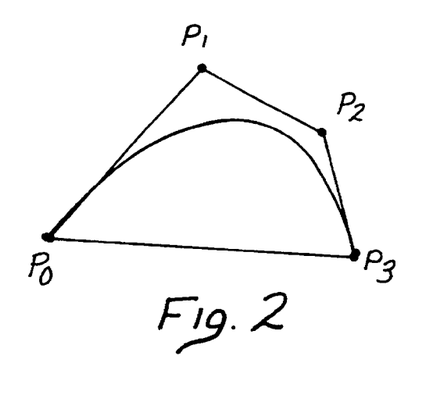
FIG. 2 is a diagrammatic illustration of a curve segment of a cubic Bezier curve.

The invention uses cubic Bezier curves to describe the font. A parametric cube curve segment is one for which the curve points are represented as a third-order polynomial of some parameter t. Because one deals with finite segments of a curve, one can limit the range of the parameter t, without loss of generality, to $0 \leq t \leq 1$. For a cubic Bezier curve segment four points are used, as shown in FIG. 2. The curved equation expressed as a vector form is as follows:

$$P(t) = \sum_{i=0}^{3} P_i t^i (1-t)^{3-i} \quad 0 \leq t \leq 1$$

A Bezier curve has many important properties. Some of them are useful when implementing the invention and are given below:

1. $P_0$ and $P_3$ are the two endpoints of the curve segment.
2. Straight line segments can be represented by Bezier curves. If a straight line is formed by connecting two points $P_0$ and $P_3$, any two points on the straight line $P_0 P_3$ can be used as the two remaining control points $P_1$ and $P_2$.
3. The two inner control points $P_1$ and $P_2$ are located on the tangent vectors of the curve segment at the two corresponding endpoints. That is, $$P_1 = P_0 + \Delta P_0 * k_0$$

$$P_2 = P_3 + \Delta P_3 * k_3$$

where $k_0$ and $k_3$ are scalars.

Figure 3:
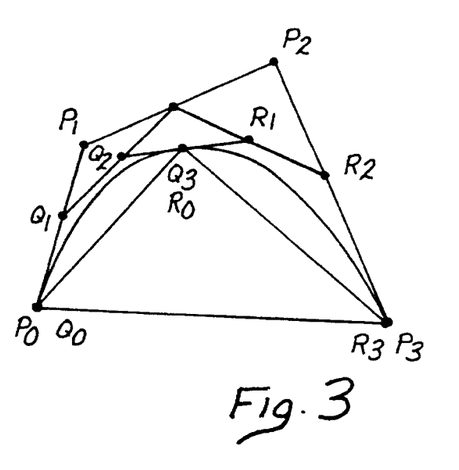
FIG. 3 is a diagrammatic illustration of the decomposition of a Bezier curve, when a piece of the Bezier curve is divided into two segments at the middle point forming each of the new curved segments as a Bezier curve.

4. When a Bezier curve is divided into two segments at the mid point t=0.5, each of them is again a Bezier curve and the new control points can be calculated by the following formulas as shown in FIG. 3:

$$Q_0 = P_0$$

$$Q_1 = \frac{P_0 + P_1}{2}$$

$$Q_2 = \frac{P_0 + 2P_1 + P_2}{4}$$

$$Q_3 = \frac{P_0 + 3P_1 + 3P_2 + P_3}{8}$$

$$R_0 = Q_3$$

$$R_1 = \frac{P_1 + 2P_2 + P_3}{4}$$

$$R_2 = \frac{P_2 + P_3}{2}$$

$$R_3 = P_3$$

The foregoing firstly tells us that if a curve is formed by joining several curve segments and the curve is closed, each curve segment can be expressed by using three data points. This is because the end-point of one curve segment is the starting-point of the following curve segment.

The foregoing secondly can be used to check whether part of a curve is a straight line. If the two control points are located on or very close to the line segment $P_0 P_3$, this curve can be considered as a straight line and can be represented by two points instead of four points. Finally, it can tell us a way of drawing a Bezier curve on a raster device.

Figure 4:
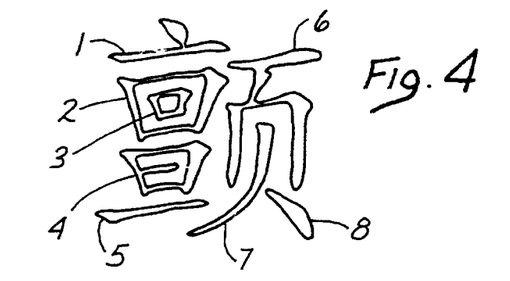
FIG. 4 is a pictorial illustration of the Chinese character "chan" consisting of 8 components and 11 contours.

Unlike English characters, most Chinese or Oriental characters consist of several disconnected components. The outline of each component can contain one or more closed contours The character "chan" for example as seen in FIG. 4, consists of eight disconnected components. Among the eight components, five components (i.e. components 1,2,5, 7,8) are represented by single closed contours. The other three (components 3,4,6) are each represented by two closed contours. Each closed contour is described by several Bezier curve segments.

For Chinese or other Oriental characters, the invention will rasterize the font component by component. That is, the invention apparatus and process will read the complete curve description of one component, rasterize it before read and rasterize the next component. Component rasterizing within a font will be based on the top-down and left-to-right orders. In the example of the character "chan", (in FIG. 4) the rasterizing process will follow the order of components 1 to 8.

For each contour, the data points describing the Bezier curve segments will be implaced in the process in a constant direction. The direction can be arbitrarily determined but must be consistent. For example, if the inner side of the closed contour is viewed from the left-hand side with respect to the direction (i.e. clockwise), the outer side will be on the right-hand side (i.e. counterclockwise). This fixed direction rule is very important for the filling process of this invention.

For purposes of discussion, the rasterizing process of the invention for one component shall be described. It is assumed that a drawing buffer (frame buffer memory) is available to store the rasterized bit mapped font image. It is further assumed that the direction of inner contour is counterclockwise, and the direction of outer contour is clockwise. Thus when the contour is traced, the filling direction (the inner part of contour that should be filled) is on right.

The filling process consists of three steps of firstly generating the font outline on the drawing buffer, and generating chain-code descriptions of the outline and chain-code flags; secondly adding missing chain-code flags; and thirdly filling inside the contour(s).

The first step as stated is to draw the font outline on the drawing buffer and at the same time generate the chain-code descriptions of the outline and chain-code flags.

Chain-code is an encoding scheme used to represent a digital curve. In this scheme, the direction vectors between successive curve pixels are encoded. A chain-code commonly employs eight directions (see FIG. 5) which can be coded by 3-bit code words.

Typically, the chain-code contains a starting pixel address followed by a string of code words. In the invention, four bits are used to represent one node, three bits for direction and one bit for a flag. Chain-code flags are the indications of contour collision points and are used by the filling process to avoid under-filling and over-filling. Contour collisions can happen when the contour is scaled down enough so that different portions of the contour are mapped on to the same set of pixels due to data quantization.

In this step, the process draws Bezier curves on the drawing buffer by using the Bezier curve decomposition property; generates the corresponding chain-code; and sets chain-code flags for colliding outline pixels.

This step in the process can be defined by the following method steps as enumerated.

---

```
01 Clear the stack, initialize variables
02 For each closed contour Do
03   Begin
04   If the segment is reduced to a single pixel
```

```
05   Begin
06     Generate the chain-code for that pixel;
07     If the associated pixel on drawing buffer is 0
08     Begin
09       Set flag for this chain-code to 0;
10       Draw that pixel on drawing buffer;
11     End
12     Else Set the flag for this chain-code to 1;
13     If the stack is empty
14       Stop;
15     Else Pop a stacked segment;
16   End
17   Else
18   Begin
19     Divide a segment into two;
20     Push the second segment into the stack;
21   End
22 End
```

In order to retain chain-code values, an additional buffer is needed. Due to the fact that the process rasterizes the font component by component, the buffer size is determined by the maximum total length (total number of pixels) of contours describing one component among all components in the font. Suppose there are N components in a Chinese character, $1_i$ represents the total number of contour pixels for component i and S is the required buffer size, we have $S=f(\max(1_i, i=1, \ldots N))$ Before the implementation of the process of the invention, the drawing buffer should be cleared. For each newly generated outline pixel, a corresponding chain-code will be created. As to whether the flag for that chain-code will be set to one is determined by its associated pixel value in the drawing buffer. If that pixel was already drawn on the drawing buffer, the flag will be set to one indicating a collision. In the alternative, the flag will be set to zero and the associated pixel in the drawing buffer will be drawn.

When this step is finished, the outlines of that font component are drawn on to drawing buffer, and the chain-codes together with their flags are also generated.

The second step in the process is undertaken in the following manner. As we said in the previous first step the contour collisions were the result of different portions of contour mapped on to the same set of pixels due to quantization error. Each of such pixels will have two associated chain-codes. During the first step only the second chain-code flag was set, an additional step is needed to check backwardly and set the missed chain-code flags. This is to guarantee the correct filling. The method step for this second step is as follows.

```
01 For each closed contour Do
02 Begin
03   Get the coordinates of the end point;
04   Do
05   Begin
06     Compute the coordinates of the current pixel from
       chain-code;
07     If the flag for this chain-code is 1
08       Clear outline pixel (x,y) on drawing buffer;
09     Else
10     If the outline pixel (x,y) is 0
11     Begin
12       Set the flag of the associated chain-code to 1;
13       Set outline pixel (x,y) on drawing buffer;
14     End
15     Else
16     If the outline is going upward along vertical
         direction AND
17       the adjacent pixel (x + 1,y) in drawing buffer
         is 1;
18       Set the flag of that associated chain-code to 1;
19   End
20   Until the current pixel reached the last one in the
     loop;
21 End
```

Since all contours are closed, the coordinates of the starting pixel will be the same as that of the ending pixel. For each contour, a pixel is chosen as the starting point and the chain-code traversed backwardly to check the missing chain-code flags. If each chain-code flag is already set, it indicates a contour collision.

An additional chain-code exists, which is also mapped on to the associated pixel which has been collided with. The invention then determines that chain-code and set its chain-code flag to one. To do this, the process will reset the pixel which has been collided with to zero in the drawing buffer and continues the traversing process. Later on, whenever the outline pixel in the drawing buffer is found as being cleared, the corresponding chain-code flag will be set.

In this second step, additional chain-code flags will be set if their corresponding contour is in a vertical direction and its interior region is only two-pixels wide. The additional flags will be used in the next step 3 that will be described to avoid over-filling.

At this point all the collision pixels in the contour, if they exist, have been detected and marked by the chain-code flags. Additional flags have also been set to avoid over-fill. Therefore the filling can now start.

For each contour, the process and the apparatus will traverse its chain-code and check its corresponding flag. If the flag is not set, the process will find the location of the corresponding contour pixel in the drawing buffer and fill its interior along horizontal directions. This filling can be either from left to right or from right to left, which is judged by the constant direction convention as described before. The filling will continue along the prescribed direction until it meets a pixel that has already been filled.

Figure 6:
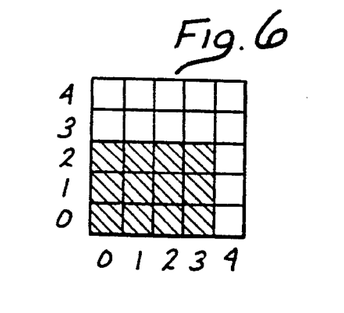
FIG. 6 is an over-filled rectangle under a conventional filling process which has been filled with 12 pixels.
Figure 7:
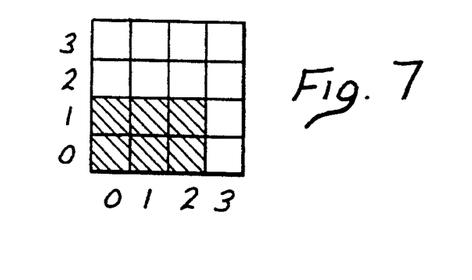
FIG. 7 is a modified pixel representation of a rectangle which has been filled with 6 pixels and is more exact than that of FIG. 6.

During filling, the process and apparatus have to deal with the over-filling problem. The process of the invention begins with an outline drawing by using the mathematical or parametric contour description. In terms of the process the contour has zero width whereas in outline drawing the outline has a fixed width of 1 pixel. For instance, consider a rectangle with coordinates (0,0),(3,2). An outline representation of the rectangle consists of four vectors (0,0), (3,0); (3,0), (3,2); (3,2), (0,2); and (0,2),(0,0). If this outline is to fill in the drawing buffer, the result is a rectangle with 12 square units (see FIG. 6). In parametric terms, however, the rectangle has only 6 square units (see FIG. 7). This is what constitutes the over-filling problem. Method steps in the following process are used to curtail these over-filled pixels.

An outline of the filling method steps of the process are as follows.

```
01 For each closed contour Do
02 Begin
03   Get the coordinates of the starting point;
04   Do
05   Begin
06     Locate the current contour pixel in drawing
       buffer from chain-code;
07     Decide the horizontal filling direction;
08     If the flag for this chain-code is zero
09       Fill the drawing buffer from that contour pixel
```

-continued

```
10      follow the horizontal filling direction until a
        filled pixel is met
11      If (the contour is in vertical-down or in
        horizontal-left direction)
12          and its corresponding chain-code flag is zero
13          Reset that contour pixel to zero
14      End
15  Until the end point is reached.
16 End
```

The two following examples are presented to illustrate the filling process of the invention. FIGS. 8 through 13 illustrate the filling process of an English character 'F', while FIGS. 16 through 21 illustrate the filling process of the numeral '5'. The chain-codes and flags generated by the first two steps of the filling algorithm are also shown in FIGS. 14, 15, 22 and 23.

The character 'F' in FIGS. 8 through 13 are scaled down to a size of a 20×20 bit map. Its outline uses a normalized 1000×1000 coordinate system and contains only one contour. When it is scaled down to a size 20×20 bit map, the origin point of the coordinate system is on the left-bottom corner (i.e. 0,0). The following explanations are based on this 'F' character described in FIGS. 8 through 13 and the associated flag codes of FIGS. 14 and 15.

In these chain-code flag tables, number '0'–'7' represents chain-code without the corresponding flag set; and number '8'–'F' represents chain-code '0'–'7' with the corresponding flag set.

Figure 8:
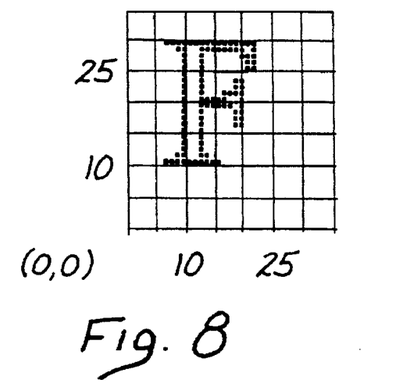
FIGS. 8 through 13 show the filling process of the invention when filling the English Character 'F'.
Figure 9:
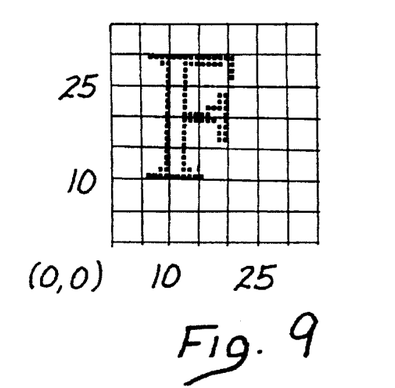
Figure 14:
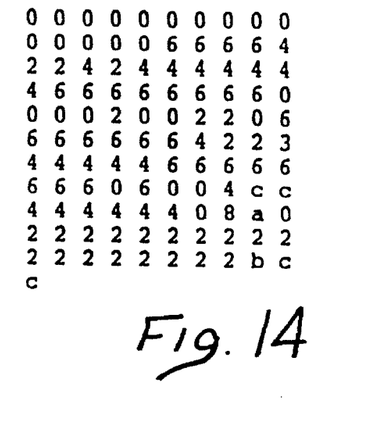
FIGS. 14 and 15 show the chain-codes and flags generated by the three steps of the filling process with respect to the letter 'F'.

In the first step of the filling process by the apparatus, the outline of the character 'F' is rasterized in the clockwise direction. The character's outline is drawn on to the drawing buffer as seen in FIG. 8. At the same time, the chain-code description of the outline is generated, with some chain-code flags set as seen in FIG. 14. The contouring process starts at the pixel (6, 29), and proceeds along the horizontal direction to the right for 15 pixels to pixel (21, 29).

There are 15 '0's in the beginning of the chain-code description to represent the horizontal movement of 15 pixels. Thereafter, the contour goes down 4 pixels from the pixel (21, 29) to the pixel (21, 25). Again looking at FIG. 14 there are 4 '6's in the chain-code description to represent the vertical movement of 4 pixels.

The next number '4' in the chain-code description indicates the horizontal movement of the contour from the pixel (21, 25) to pixel (20, 25). The numbers '0', '4', '6' for the chain-code description are chain-codes whose flags are not set. This means proceeding straight toward the right, then going straight down and going straight to the left respectively.

Figure 5:
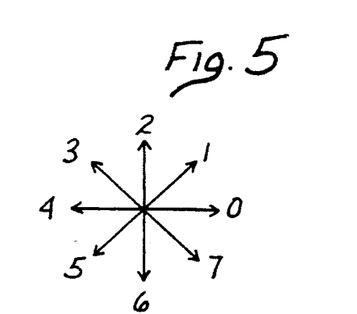
FIG. 5 is a diagrammatic illustration of a chain-code representation having 8 values from 0 to 7 to indicate 8 directions.

The meaning of the chain-codes can be found in FIG. 5. There are some chain-codes in FIG. 14 wherein the flags are set, such as the last two chain-codes 'c'. They mean the same thing as chain-code '4' except the flags are set. The first 'c' indicates that the contour proceeds one pixel to the left from the pixel (8, 29) to pixel (7, 29) and the contour pixels collide at the pixel (7, 29). The second 'c' indicates that the contour goes one pixel toward the left from the pixel (7, 29) to pixel (6, 29) and the contour pixels collide at the pixel (6, 29). The chain-code descriptions of the first two pixels (6, 29) and (7, 29) should also have flags set at this step to indicate collisions of the two pixels. However, this is avoided at this step because when the first two '0's are generated, the process of the method steps does not know that there will be collisions of the two pixels. The next step will add back these missing flags.

Figure 15:
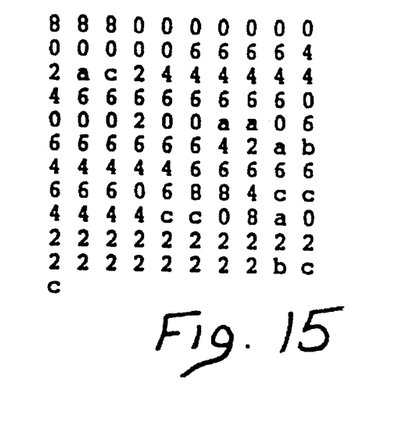
Figure 16:
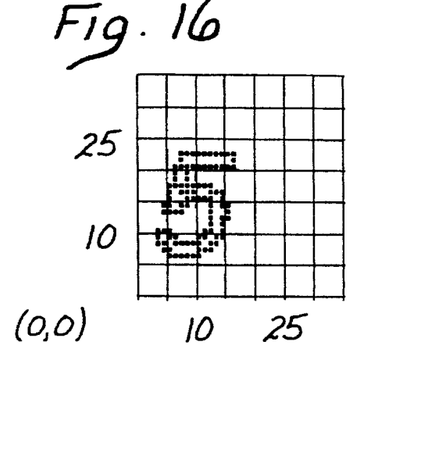
FIGS. 16 through 21 show the filling process of the invention when filling the Numeral '5'.
Figure 17:
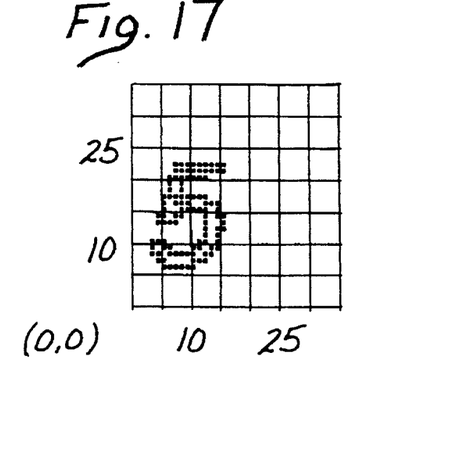
Figure 18:
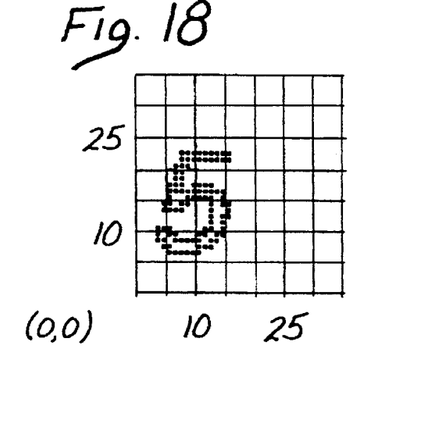
Figure 19:
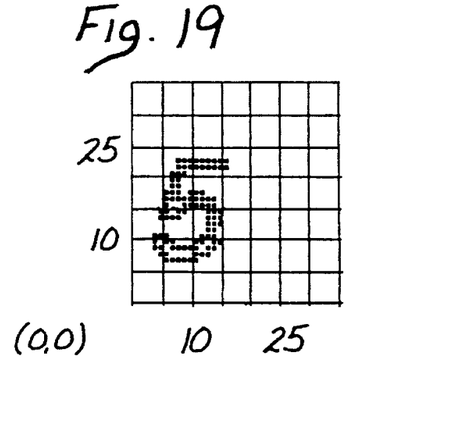
Figure 20:
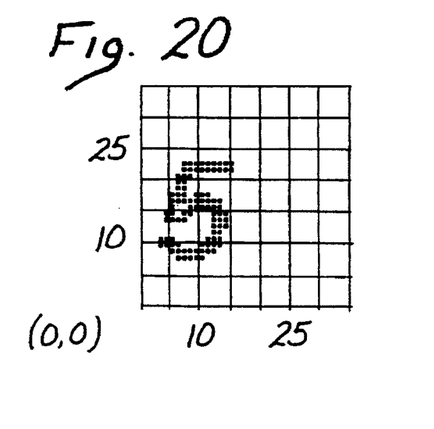
Figure 21:
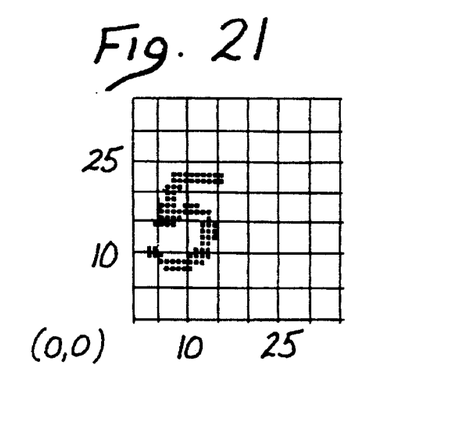

During the second step of the filling process of the apparatus the missing chain-code flags are set as seen in FIG. 15. The contour is traced in the counterclockwise direction from the starting pixel (6, 29), guided by the chain-codes generated in the first step. During this process, the chain-code flags and the contour pixels in the image buffer are checked. When the contour is traced from pixel (6, 29) to (7, 29), because the flag for the associated chain-code 'c' is set, the pixel (6, 29) in the image plane is cleared. For the same reason, the pixel (7, 29) in the image plane is also cleared.

When the contour is traced to pixel (7, 29) again from the horizontal direction, the pixel is found to have been cleared. At this point the flag of the associated chain-code is set. This chain-code is the second '8' in the beginning of the chain-code table, whose value in FIG. 14 was '0' meaning the flag was not set. In the meantime, the pixel (7, 29) in image plane is set again. In the same way, the flag is also set for the first chain-code in the chain-code table for pixel (6, 29). Also, the pixel (6, 29) in the image plane is set again. With this second step, all the chain-code flags needed in the filling process are set correctly.

In the third step of the process, the filling starts from pixel (6, 29) in the clockwise direction along the contours. FIGS. 9 through 12 show the intermediate results of the filling process to pixel (18, 28), (12, 22), (19, 19) and (12, 13). During the process of filling, the contour is scanned clockwise. At every contour pixel, the associated chain-code flag is checked. If the flag is set, then filling is not performed. Otherwise, the inner part, between the pixel and another contour pixel which has already been drawn on the image plane, is filled.

The filling direction at a contour pixel is determined by the combination of two chain-codes arriving and leaving the pixel. For example, in FIG. 10, the chain-codes arriving and leaving the pixel (12, 22) are both '6'. In this case, the filling direction is horizontally to the left. The horizontal line 22 is filled from Pixel (12, 22), to pixel (9, 22) which is a contour pixel at another edge of the stroke.

Figure 10:
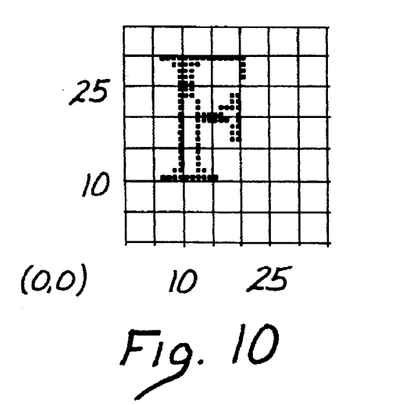
Figure 11:
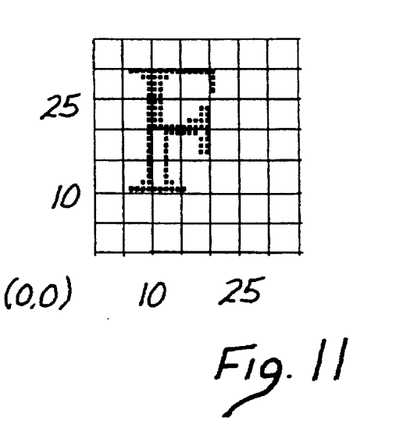
Figure 12:
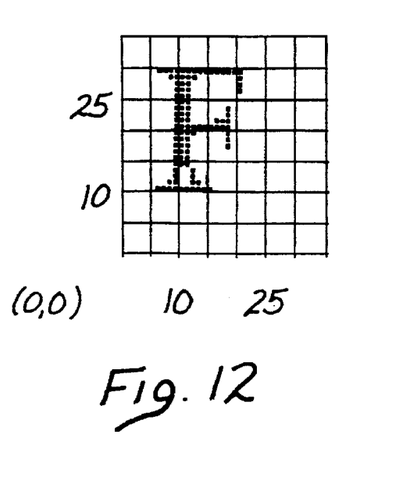
Figure 13:
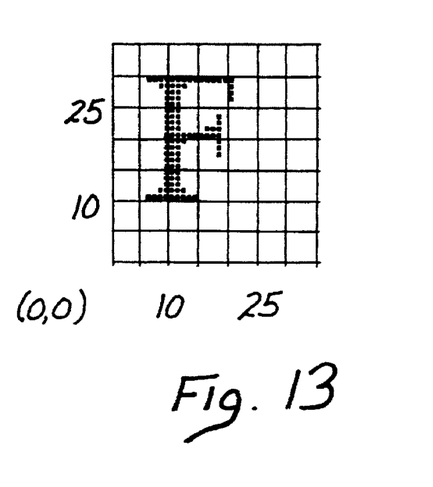

In some cases, the combination indicates that no filling should be performed at the contour pixel. That means an apex is reached which does not need to be filled. During the filling process, the pixels of the contour going down and going to the left are removed from the image buffer to recover from the error caused by the difference between the mathematical or parametric edge and the real edge in the image buffer. The horizontal strokes and vertical strokes in FIGS. 10, 11 and 12 are thinner after filling. This is the effect of the removing process. The final result is given in FIG. 13.

Figure 22:
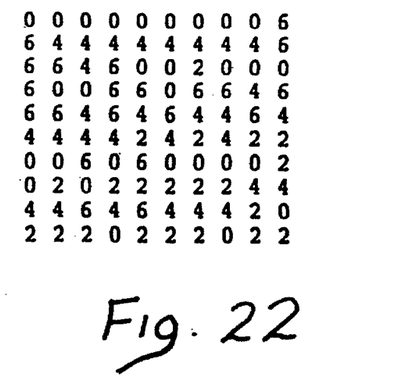
FIGS. 22 and 23 show the chain-codes and flags generated by the three steps of the filling process with respect to the Numeral '5'.
Figure 23:
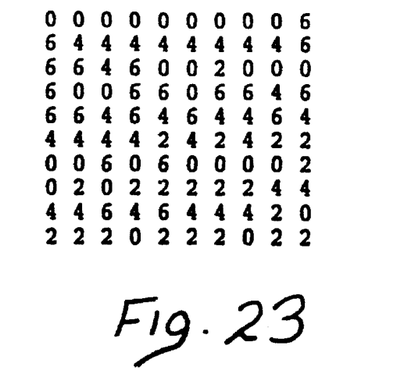

The foregoing description in FIGS. 8 through 15 applies in an analogous example to the numeral 5 described in FIGS. 16 through 23, Thus the chain-codes set in FIGS. 22 and 23 and the relative position of the pixel orientation process of FIGS. 16 through 21 are in direct correspondence in the description hereof of the filling process for the letter 'F'.

The following claims should be read broadly in light of the foregoing specification of this invention.

We claim:

1. A process for converting outlined representations of a character into its bit mapped form to form a character font comprising:

providing a first buffer for a bit map form of a character;

providing a second buffer for a chain-code representation of the outline of the character;

drawing the outline of the character into the first buffer:

generating chain-code representations of contour of the character;

setting flags in chain-code in said second buffer to indicate contour collisions;

scanning the contours of the chain-code representations to add missing chain-code flags;

scanning and filling the inside part of the contour of the character; and, printing said character.

2. The process as claimed in claim 1 further comprising:

rasterizing a font component which has multiple components.

3. The process as claimed in claim 2 further comprising:

reading a complete curve description of one component;

rasterizing the curve description; and, then reading the next component and rasterizing it in sequential order.

4. The process as claimed in claim 3 further comprising:

drawing a Bezier curve during the rasterizing process for describing the character.

5. The process as claimed in claim 4 further comprising:

describing the Bezier curve segments in a constant direction.

6. The process as claimed in claim 5 further comprising:

initiating the chain-code with a starting pixel with four bits used to represent one node, three bits for direction, and a starting bit for a flag.

7. The process as claimed in claim 6 further comprising:

indicating contour collision points with chain-code flags.

8. The process of providing a bit map through character conversion for a font of a particular character comprising:

converting a curve description of contours of the character into their bit mapped descriptions and chain-code descriptions;

setting flags on the chain-code description to avoid over-filling and under-filling;

curtailing over-filling by establishing a differential between a parametric description and the pixel description of the outline of the font; and, filling an interior portion of the contour to obtain the bit mapped font.

9. The process as claimed in claim 8 further comprising:

scanning only the inside of the contour of said font.

10. The process as claimed in claim 8 further comprising:

establishing the filling direction based on a direction of the contours of the font.

11. The process as claimed in claim 8 further comprising:

providing a first memory buffer for a image of the font; and, providing a second buffer for the chain codes.

12. The process as claimed in claim 11 wherein:

said first buffer is equal to or greater than the biggest character to be printed with one bit for each respective pixel.

13. The process of filling components of a font for producing a character in a printing process comprising:

generating the font outline on a drawing buffer:

generating chain-code descriptions of the outline;

providing chain-code flags to avoid contour collisions;

adding missing chain-code flags; and, filling an inside portion of the contours of the components on the font.

14. The process as claimed in claim 13 further comprising:

providing direction vectors between successive curve pixels that are to be encoded when generating the font outline on the drawing buffer.

15. The process as claimed in claim 14 wherein:

the drawing buffer draws Bezier curves by using Bezier curve decomposition.

16. The process as claimed in claim 14 further comprising:

maintaining chain-code values through at least a second buffer.

17. The process as claimed in claim 14 further comprising:

providing a corresponding chain-code for each newly generated outline pixel for a respective component of the character.

18. The process as claimed in claim 17 further comprising:

setting a chain-code flag to indicate a collision of pixels which have been drawn on the drawing buffer.

19. The process as claimed in claim 18 further comprising:

choosing a pixel at the starting point of the drawing buffer;

traversing the chain-code backwards to check for missing chain-code flags; and, establishing any contour collisions thereby.

20. The process as claimed in claim 14 further comprising:

detecting and marking collision chain-code flags;

setting additional chain-code flags to avoid over-filling; and, filling said font.

* * * * *